(12) United States Patent
Moseke

(10) Patent No.: US 10,644,444 B2
(45) Date of Patent: May 5, 2020

(54) PLUG CONNECTOR PART WITH A LOCKING ELEMENT

(71) Applicant: PHOENIX CONTACT E-MOBILITY GMBH, Schieder-Schwalenberg (DE)

(72) Inventor: Dirk Moseke, Hoexter-Luechtringen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/306,909

(22) PCT Filed: Jul. 14, 2017

(86) PCT No.: PCT/EP2017/067807
§ 371 (c)(1),
(2) Date: Dec. 4, 2018

(87) PCT Pub. No.: WO2018/011385
PCT Pub. Date: Jan. 18, 2018

(65) Prior Publication Data
US 2019/0312384 A1 Oct. 10, 2019

(30) Foreign Application Priority Data
Jul. 14, 2016 (DE) .......................... 10 2016 112 937

(51) Int. Cl.
*H01R 13/639* (2006.01)
*H01R 13/627* (2006.01)
(Continued)

(52) U.S. Cl.
CPC .......... *H01R 13/6275* (2013.01); *B60L 53/16* (2019.02); *H01R 13/62933* (2013.01);
(Continued)

(58) Field of Classification Search
CPC .............. H01R 13/6275; H01R 13/639; H01R 13/62933; H01R 13/6278; H01R 2201/02; B60L 53/16
See application file for complete search history.

(56) References Cited

U.S. PATENT DOCUMENTS 5,429,524 A * 7/1995 Wakata ................. B60L 3/0069
439/310
5,558,533 A 9/1996 Hashizawa et al.
(Continued)

FOREIGN PATENT DOCUMENTS

DE 4343210 A1 7/1994
DE 102010041229 A1 6/2011
(Continued)

*Primary Examiner* — Truc T Nguyen
(74) *Attorney, Agent, or Firm* — Leydig, Voit & Mayer, Ltd.

(57) ABSTRACT

A plug-in connector part for connection to an associated mating plug-in connector part includes: a housing; a plug-in portion arranged on the housing and pluggable into an associated mating plug-in connector part in a plug-in direction and is engaged with the mating plug-in connector part when in a connected position, at least one electrical contact element being arranged on the plug-in portion and for electrically contacting the mating plug-in connector part; a locking element that is movably arranged on the housing, the locking element having a locking position for locking the plug-in connector part with respect to the mating plug-in connector part in the connected position, and being movable out of the locking position to unlock the connection between the plug-in connector part and the mating plug-in connector part; and a pressing element movably arranged on the housing, the pressing element being actuable in a first actuation direction.

15 Claims, 4 Drawing Sheets

(51) Int. Cl.
   *B60L 53/16*   (2019.01)
   *H01R 13/629*  (2006.01)
(52) U.S. Cl.
   CPC ....... *H01R 13/639* (2013.01); *H01R 13/6278* (2013.01); *H01R 2201/26* (2013.01)

(56) References Cited

U.S. PATENT DOCUMENTS

| | | | |
|---|---|---|---|
| 6,371,768 B1* | 4/2002 | Neblett | H01R 13/701 439/34 |
| 2011/0034053 A1 | 2/2011 | Matsumoto et al. | |
| 2011/0070758 A1* | 3/2011 | Poulin | H01R 13/6275 439/153 |
| 2011/0171850 A1 | 7/2011 | Brown, II | |
| 2012/0003861 A1* | 1/2012 | Kwasny | H01R 13/506 439/474 |
| 2013/0047687 A1 | 2/2013 | Kurumizawa et al. | |
| 2013/0134933 A1* | 5/2013 | Drew | H02H 5/04 320/109 |
| 2013/0252448 A1 | 9/2013 | Schulte et al. | |
| 2014/0191718 A1* | 7/2014 | Reineccius | B60L 53/305 320/108 |
| 2014/0220808 A1* | 8/2014 | Fuehrer | H01R 13/6272 439/345 |
| 2014/0287614 A1* | 9/2014 | Nakajima | H01R 13/6275 439/489 |
| 2015/0197157 A1* | 7/2015 | Nakajima | B60L 11/1818 439/352 |
| 2015/0318644 A1* | 11/2015 | Ens | H01R 13/424 439/188 |
| 2016/0280086 A1* | 9/2016 | Lopez | B60L 11/1818 |
| 2016/0322748 A1 | 11/2016 | Yahagi et al. | |
| 2017/0047679 A1* | 2/2017 | Garth | H01R 13/6275 |
| 2017/0197514 A1* | 7/2017 | Rivas | B60L 11/1818 |

FOREIGN PATENT DOCUMENTS

| | | |
|---|---|---|
| DE | 102010062234 A | 7/2011 |
| DE | 102013204904 A1 | 9/2013 |
| WO | WO 2011092431 A1 | 8/2011 |
| WO | WO 2015093400 A1 | 6/2015 |

\* cited by examiner

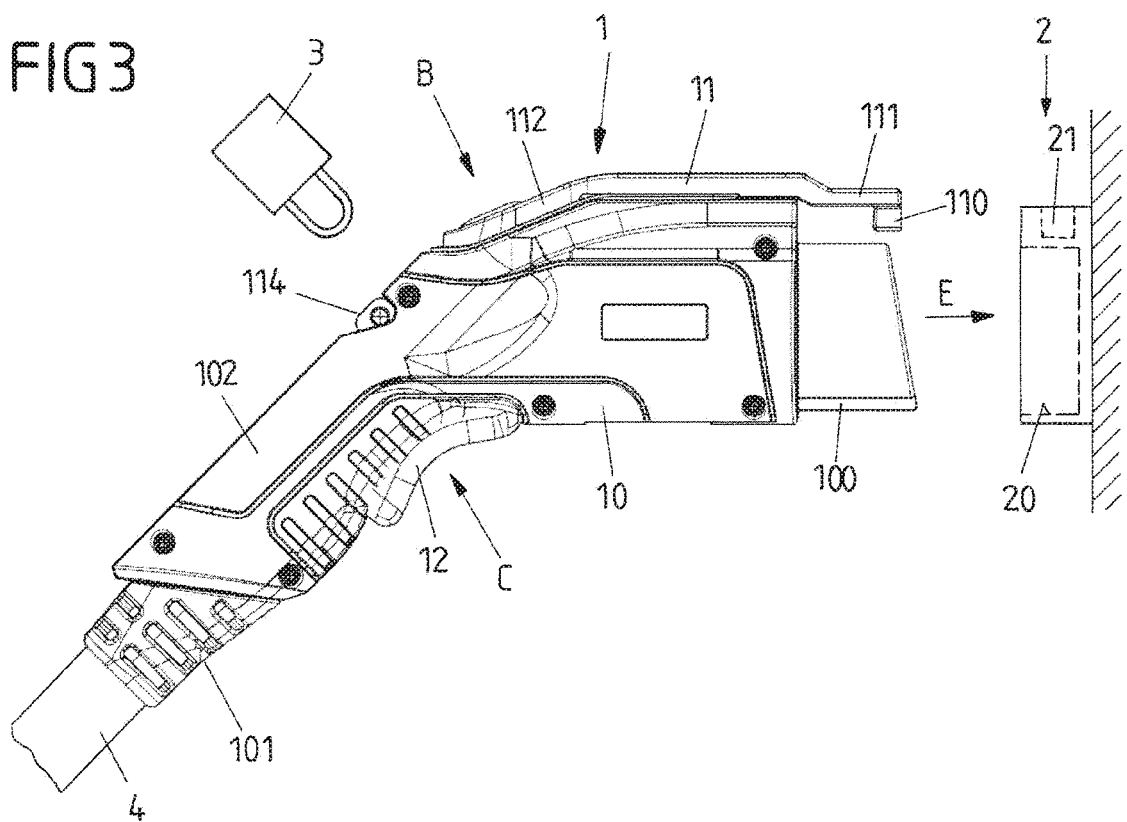
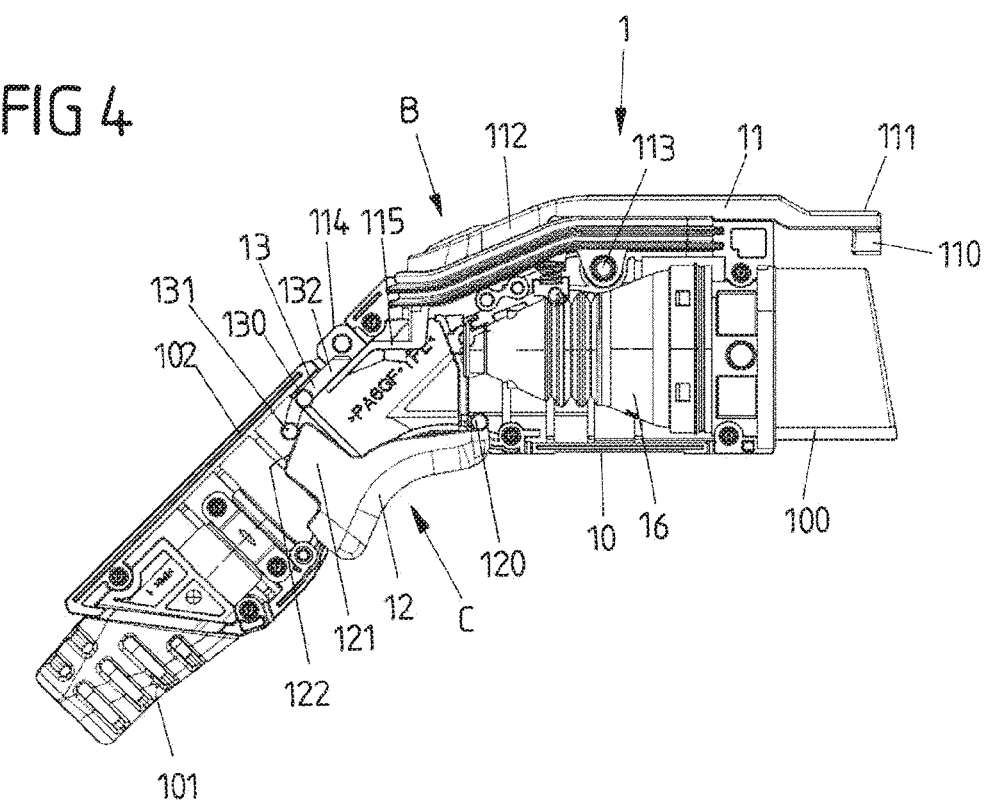

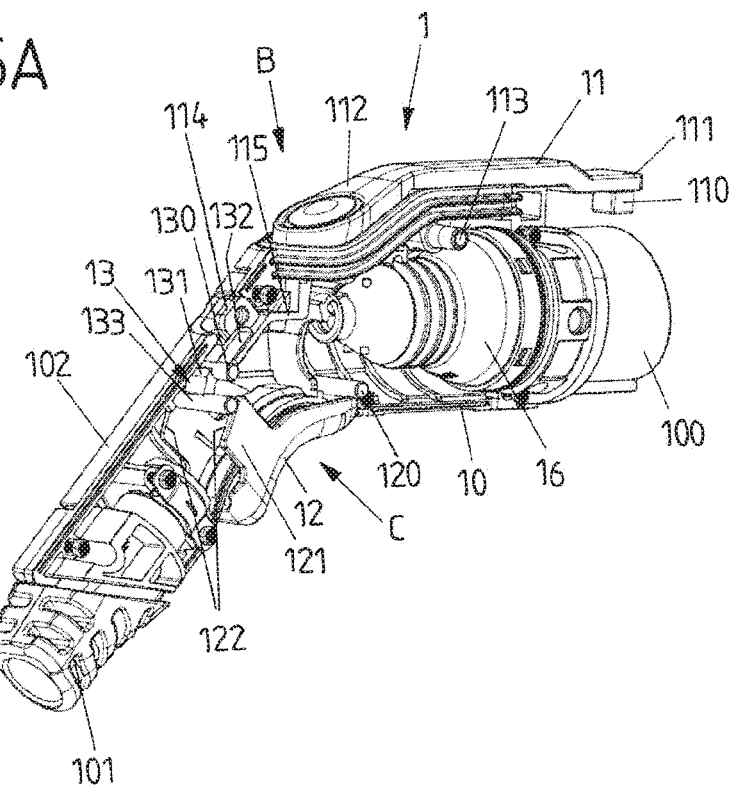

PLUG CONNECTOR PART WITH A LOCKING ELEMENT

CROSS-REFERENCE TO PRIOR APPLICATIONS

This application is a U.S. National Phase application under 35 U.S.C. § 371 of International Application No. PCT/EP2017/067807, filed on Jul. 14, 2017, and claims benefit to German Patent Application No. DE 10 2016 112 937.2, filed on Jul. 14, 2016. The International Application was published in German on Jan. 18, 2018 as WO 2018/011385 under PCT Article 21(2).

FIELD

The invention relates to a plug-in connector part for connection to an associated mating plug-in connector part.

BACKGROUND

A plug-in connector part of this kind comprises a housing and a plug-in portion that is arranged on the housing and can be plugged into an associated mating plug-in connector part in a plug-in direction and is engaged with the mating plug-in connector part when in a connected position, at least one electrical contact element being arranged on the plug-in portion for electrically contacting the mating plug-in connector part. A locking element is movably arranged on the housing, has a locking position for locking the plug-in connector part in the connected position with respect to the mating plug-in connector part, and can be moved out of the locking position to release the connection between the plug-in connector part and the mating plug-in connector part.

A plug-in connector part of this kind can, for example, be designed as a charging plug on a charging system for charging an electrically operated vehicle (also called an electric vehicle). A plug-in connector part of this kind can, for example, be arranged on a charging cable and be intended to be plugged into a charging socket on a vehicle. In order to charge an electric vehicle, the charging plug is plugged into the charging socket and, when inserted, establishes an electrical connection for transmitting a charging current in the form of an alternating current or direct current.

In this context, the locking element serves to ensure that the plug-in connector part cannot be unintentionally pulled out of the associated mating plug-in connector part during a charging process, which would lead to the charging process being interrupted. As a result of the locking provided by the locking element when the plug-in connector part is in the connected position with the mating plug-in connector part, the plug-in connector part is held in a defined position relative to the mating plug-in connector part and cannot be released from the mating plug-in connector part counter to the plug-in direction.

Plug-in connector parts comprising a locking element are known from US 2013/0047687 A1, US 2011/0034053 A1 and DE 10 2013 204 904 A1, for example.

In a conventional plug-in connector part, as described for example in US 2013/0047687 A1, the locking element can be actuated by hand, for example with the thumb of the hand which grips the plug-in connector part being pressed onto an actuation portion on the locking element. As a result, the locking element can be raised out of the locked position thereof and the locking of the plug-in connector part to the associated mating plug-in connector part is therefore released.

SUMMARY

In an embodiment, the present invention provides a plug-in connector part for connection to an associated mating plug-in connector part, comprising: a housing; a plug-in portion that is arranged on the housing and is pluggable into an associated mating plug-in connector part in a plug-in direction and is engaged with the mating plug-in connector part when in a connected position, at least one electrical contact element being arranged on the plug-in portion and configured to electrically contact the mating plug-in connector part; a locking element that is movably arranged on the housing, the locking element having a locking position for locking the plug-in connector part with respect to the mating plug-in connector part in the connected position, and being movable out of the locking position to unlock the connection between the plug-in connector part and the mating plug-in connector part; and a pressing element movably arranged on the housing, the pressing element being actuable in a first actuation direction, and operatively connected to the locking element by a deflection element in order to act, by the deflection element, on the locking element in a second actuation direction that is different to the first actuation direction in order to unlock the connection between the plug-in connector part and the mating plug-in connector part.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is a side view of the plug-in connector part;

FIG. 4 is a partially cut away side view of the plug-in connector part;

FIG. 5A is a partially cut away perspective view of the plug-in connector part;

FIG. 5B is the partially cut away perspective view when the pressing element has been actuated in order to unlock the locking element;

DETAILED DESCRIPTION

Figure 1:
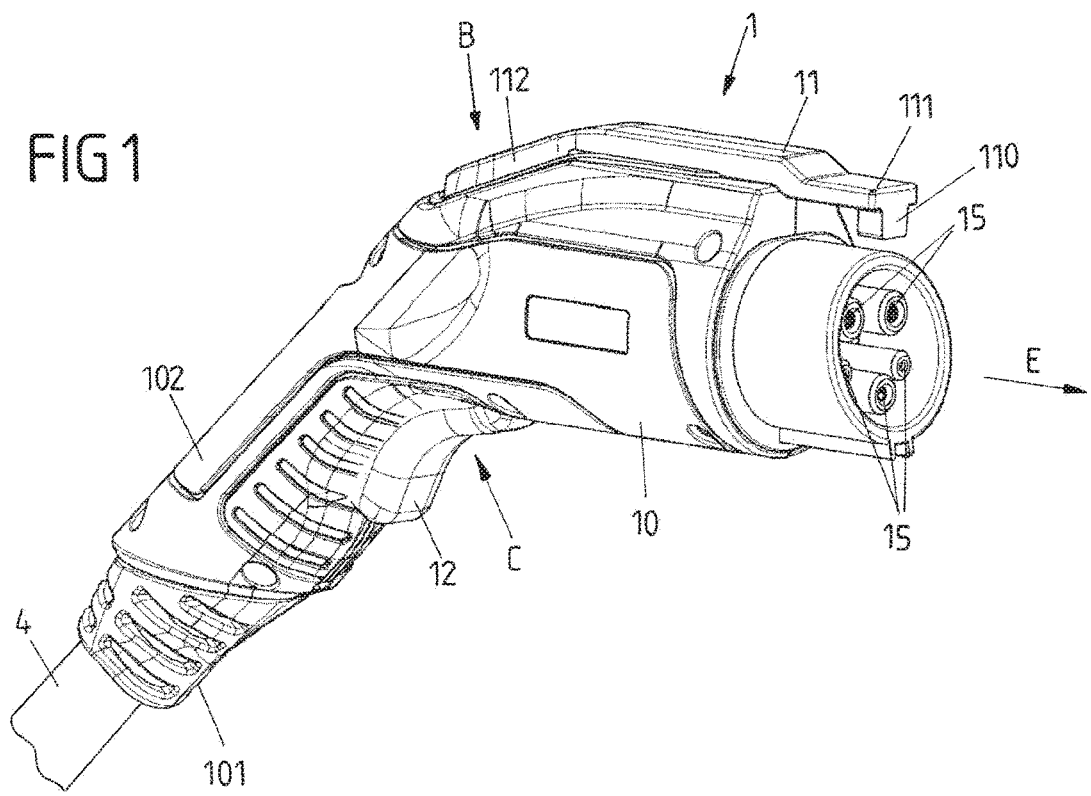
FIG. 1 is a perspective view of a plug-in connector part in the form of a charging plug comprising a locking element arranged thereon and a pressing element for actuating the locking element.
Figure 2:
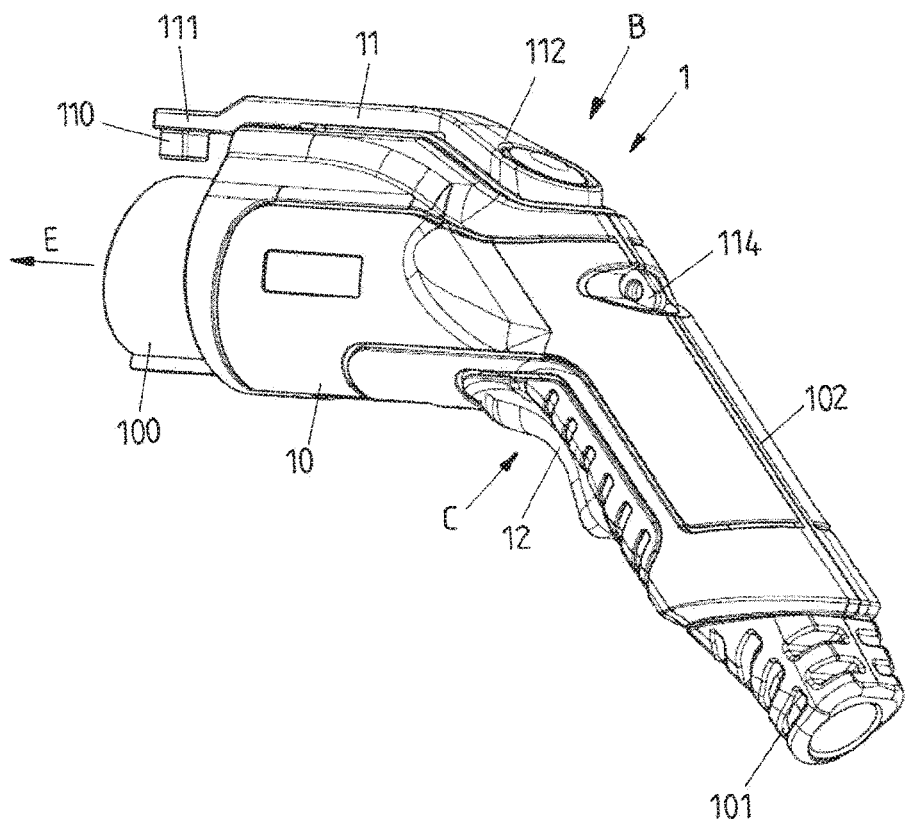
FIG. 2 is a different perspective view of the plug-in connector part.

In an embodiment the present invention provides a plug-in connector part in which the operating convenience for actuating the locking element can be improved.

Accordingly, a pressing element that is movably arranged on the housing is provided which can be actuated in a first actuation direction and is operatively connected to the locking element by means of a deflection element in order to act, by means of the deflection element, on the locking element in a second actuation direction that is different to the first actuation direction in order to unlock the connection between the plug-in connector part and the mating plug-in connector part.

Since the pressing element is operatively connected to the locking element by means of the deflection element, the pressing element can be arranged on the housing of the plug-in connector part so as to be spatially separated from the locking element. The locking element can therefore, for example, be arranged on an upper rear side of the plug-in connector part, whereas the pressing element is arranged on a side that faces away from the locking element, e.g. a lower side of the housing. A user who grips the plug-in connector part using one hand can therefore act on the pressing element by means of their forefinger (in the manner of a pistol trigger), for example, in order to press on the pressing element and thereby actuate the locking element.

In this case the actuation occurs by means of the deflection element, which deflects the actuation force exerted on the pressing element and acts on the locking element in the second actuation direction that is different from the first actuation direction in order to release said locking element out of the locked position thereof.

In the present case, the first actuation direction being different from the second actuation direction is understood to mean that the first actuation direction and the second actuation direction are not oriented in the same direction. The first actuation direction and the second actuation direction can, for example, be oriented counter to one another or even at an angle to one another.

The pressing element can, for example, be operatively connected to the locking element by means of a lever gearing of which the deflection element is a component. For this purpose, the deflection element can, for example, be mounted on the housing so as to be able to pivot about a first pivot shaft. The deflection element in this case has a first lever arm which extends from the pivot shaft in a first direction and by means of which the deflection element is operatively connected to the pressing element, and also has a second lever arm which extends in a second direction that is different from the first direction and by means of which the deflection element is operatively connected to the locking element. When the pressing element acts on the first lever arm of the deflection element in the first actuation direction, this leads to the deflection element pivoting about the pivot shaft thereof such that the second lever arm also pivots and as a result the locking element is actuated in the second actuation direction.

In one embodiment, the pressing element is mounted on the housing so as to be able to pivot about a second pivot shaft. The pressing element can therefore be pivoted toward the housing in order to actuate the pressing element in the first actuation direction.

However, it is also conceivable and possible to slidably mount the pressing element on the housing, for example. In this case, the pressing element can be slid along a (straight or curved) path of movement on the housing in order to actuate the pressing element to unlock the locking element.

In one embodiment, the pressing element can, for example, have two mutually spaced transmission portions for acting on the deflection element. The transmission portions extend in parallel with one another and are preferably axially spaced apart along the pivot shaft associated with the pressing element. An electrical line can therefore be laid therethrough between the transmission portions in order to electrically connect the electrical contact elements of the plug-in connector part.

In order to receive an actuation force from the pressing element, the deflection element can, for example, have a bearing pin which extends, for example, in parallel with the pivot shaft associated with the deflection element (transversely with respect to the second actuation direction). By means of the bearing pin, the pressing element (for example together with the two mutually spaced transmission portions thereof) acts on the deflection element in order to move the deflection element when the pressing element is actuated.

The pressing element preferably has, in particular on the mutually spaced transmission portions thereof, a pressing contour that extends diagonally with respect to the first actuation direction. The pressing element acts on the deflection element by means of the pressing contour, the pressing contour for example abutting the bearing pin of the deflection element when the pressing element is actuated and sliding along the bearing pin. As a result of the diagonal orientation of the pressing contour, a suitable step-up gear (or even step-down gear) of the lever gearing provided by the deflection element can be adjusted such that actuating the pressing element leads to the locking element being suitably adjusted in order to raise the locking element out of the locking position thereof.

In one embodiment, the locking element can be arranged on the housing so as to be able to pivot about a pivot shaft. In this case, for example, one end of the locking element can have a locking portion for locking to the mating plug-in connector part when in the connected position and the locking element can be actuated by means of an actuation portion on an end that is remote from the locking portion. The actuation portion can, for example, be accessible to a user from the outside such that a user can, for example, press on the actuation portion from the outside in order to thus pivot the locking element, for example, about the pivot shaft thereof and to move it out of the locking position thereof.

Advantageously, the locking element is spring-preloaded toward the locking position thereof such that the locking element automatically reaches the locking position thereof when the plug-in connector part is brought into engagement in a plug-in manner with the associated mating plug-in connector part. In order to release the locking, a user can, for example, press on the actuation portion in order to thus pivot the locking element and release the locking.

By means of the spring element that preloads the locking element, the pressing element is in this case also (indirectly) preloaded in the non-actuated starting position thereof, such that the pressing element, when not actuated, is held in the starting position.

The deflection element can, for example, act on an arm of the locking element that extends from the actuation portion in order to press the actuation portion in the second actuation direction when the pressing element is actuated. The deflection element therefore acts on the lever arm of the locking element on which the actuation portion is also formed. The locking element can therefore be actuated by means of the deflection element in order to unlock the locking element.

A blocking device can in this case also be arranged, for example, on said arm on which the deflection element acts, which blocking device is used to block the locking element in the locking position. The blocking device can be a lock, for example. However, it is also conceivable and possible to design the blocking device as a simple ring, to which a lock in the form of a padlock can be attached.

By providing the pressing element on one side and the actuation portion on the locking element on the other side, the locking element can be actuated in two ways. A user can therefore press on the pressing element or on the actuation portion in order to unlock the locking element. In this case, it is possible to actuate the locking element independently of the pressing element by means of the actuation portion, such that the pressing element is not subject to a force when the locking element is actuated by means of the actuation portion and the pressing element in particular does not prevent a movement of the actuation portion either. When the locking element is actuated by means of the actuation portion and is therefore moved out of operative connection with the pressing element, no force acts on the pressing element, it being conceivable that the pressing element can move freely and independently if it is not separately spring-preloaded in the non-actuated starting position thereof by means of a spring element.

However, in this context it is also conceivable and possible, in another embodiment, that the locking element and the pressing element always move in a coupled manner and that the pressing element moves therewith when the locking element is actuated by means of the actuation portion.

However, when the pressing element is actuated, the actuation portion is moved together therewith simply because the actuation portion is formed on the locking element.

The actuation portion of the locking element can, for example, be arranged on a first side of the housing of the plug-in connector part, for example on a rear side of the housing, and can be accessible to a user for actuation. In contrast, the pressing element can be arranged on a second side of the housing that faces away from the first side, for example on a lower side of the housing. A user who grips the plug-in connector part using one hand can therefore, for example, comfortably act on the actuation portion by means of their thumb or on the pressing element by means of their forefinger in order to unlock the locking element either by means of the actuation portion or the pressing element. The actuation can therefore be carried out by a user simply, intuitively and comfortably.

FIG. 1 to 6A, 6B show an embodiment of a plug-in connector part 1 in the form of a charging plug, which can be brought into engagement in a plug-in manner with an associated mating plug-in connector part 2 in the form of a charging socket, for example on a vehicle, in a plug-in direction E (see FIG. 3).

The plug-in connector part 1 has a housing 10, on a front end of which a plug-in portion 100 is arranged which can be plugged into a plug-in opening 20 in the mating plug-in connector part 2 in the plug-in direction E. Contact elements 15 (see FIG. 1) are arranged on the plug-in portion 100, which contact elements electrically contact the mating plug-in connector part 2 when the plug-in connector part 1 is connected and thus establish an electrical connection between the plug-in connector part 1 and the mating plug-in connector part 2 when the plug-in connector part 1 is in a connected position, via which connection a charging current, for example in the form of an alternating current, can be transmitted.

An end of the housing 10 that faces away from the plug-in portion 100 has a handle 102 which extends diagonally with respect to the plug-in direction E and to which a cable outlet 101 connects. An electrical line 4 (see FIG. 1) is guided out of the plug-in connector part 1 by means of the cable outlet 101.

A locking element 11 is provided on the housing 10, which element can be pivoted about a pivot shaft 113 (see FIG. 4) and has a locking portion 110 in the form of a detent on an end 111 that faces the mating plug-in connector part 2, which detent engages with a locking engagement 21 of the mating plug-in connector part 2 in a locking manner when the plug-in connector part 1 is plugged into the mating plug-in connector part 2 such that the connection between the plug-in connector part 1 and the mating plug-in connector part 2 is locked and the plug-in connector part 1 therefore cannot be removed from the mating plug-in connector part 2 counter to the plug-in direction E as long as the plug-in connector part 1 is locked with the mating plug-in connector part 2 by means of the locking element 11.

The locking element 11 is spring-preloaded toward the locking position thereof relative to the housing 10 by means of a spring element 14 in the form of a compression spring (see FIGS. 6A and 6B), such that the locking is produced automatically when the plug-in connector part 1 is plugged into the mating plug-in connector part 2.

The locking portion 110 is arranged on a first lever arm of the locking element 11 that extends from the pivot shaft 113 toward the plug-in portion 100. In contrast, an actuation portion 112 is formed on a second lever arm extending toward the handle 102, which portion is accessible to a user from the outside and on which portion a user can press in an actuation direction B in order to pivot the locking element 11 about the pivot shaft 113 and release the locking to the mating plug-in connector part 2. In order to remove the plug-in connector part 1 from the mating plug-in connector part 2, a user can therefore press on the actuation portion 112 in order to release the locking, and can then pull the plug-in connector part 1 out of the mating plug-in connector part 2 counter to the plug-in direction E.

In the embodiment shown, an arm 115 that projects over the actuation portion 112 is arranged on the actuation portion 112, on which arm a blocking device 114 in the form of a ring is arranged. A lock 3 (see FIG. 3) in the form of a padlock can be attached to the blocking device 114 in order to block the locking element 11 in the locking position thereof and therefore prevent unauthorized release of the locking. Only an authorized user who has a matching key to the lock 3 can unlock the lock 3 and remove it from the blocking device 114 so that the locking element 11 can be actuated.

The locking element 11 can be actuated out of the locking position thereof by means of the actuation portion 112 by a user, who grips the handle 102 using one hand, pressing on the actuation portion 112 using a thumb and therefore moving the actuation portion 112 into the housing 10 in the actuation direction B. In so doing, the locking element 11 together with the locking portion 110 thereof is raised out of the locking engagement 21 on the mating plug-in connector part 2, such that the locking between the locking element 11 and the mating plug-in connector part 2 is released and the plug-in connector part 1 can therefore be pulled out of the mating plug-in connector part 2 counter to the plug-in direction E.

A pressing element 12 is also provided which is arranged on a lower side of the housing 10, facing the actuation portion 112 of the locking element 11 that is arranged on the rear side of the housing 10, and can be actuated, for example, by means of the forefinger of the hand of the user that grips the handle 102. The pressing element 12 is mounted on the housing 10 so as to be able to pivot about a pivot shaft 120 and can be actuated in an actuation direction C in order to move the locking element 11 out of the locking position thereof.

Figure 6A:
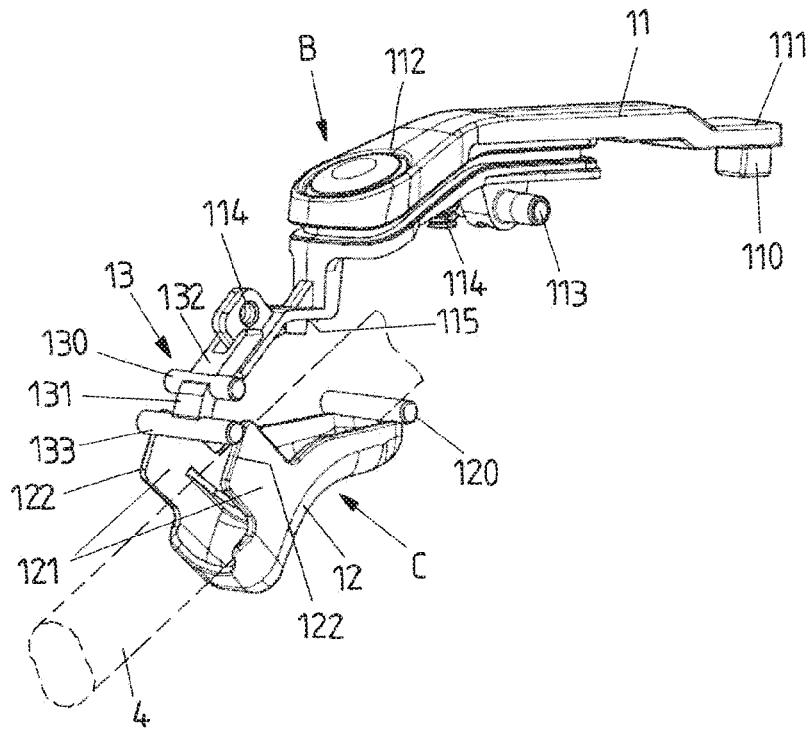
FIG. 6A is a separate view of a locking assembly of the plug-in connector part.
Figure 6B:
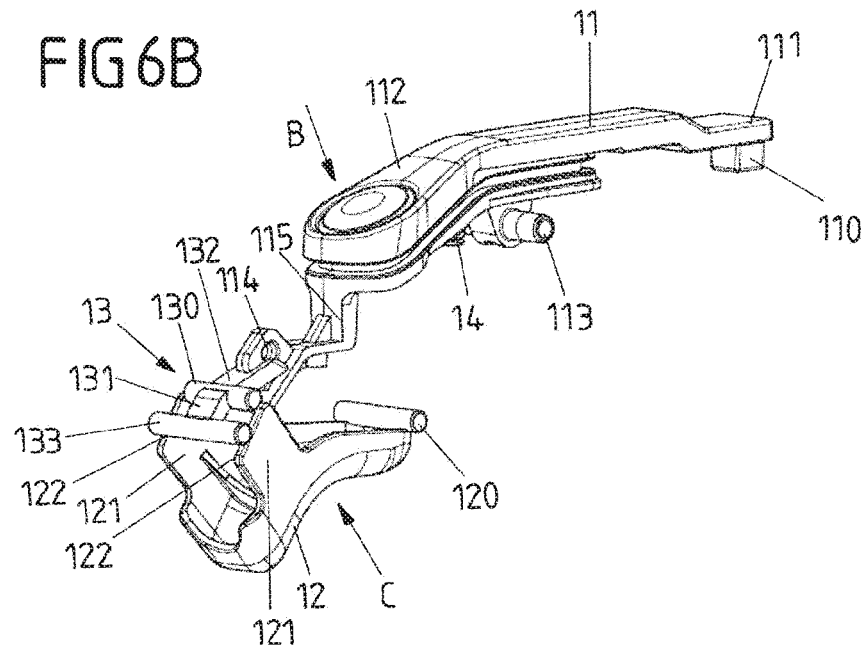
FIG. 6B is the assembly from FIG. 6A when the pressing element has been actuated.

As can be seen for example from the views according to FIGS. 6A and 6B, the pressing element 12 has two transmission portions 121 which are mutually spaced along the pivot shaft 120 and which form a gap therebetween through which the line 4 can be laid. The line 4 can therefore extend therethrough between the transmission portions 121 in order to contact the contact elements 15 on the plug-in portion 100 of the plug-in connector part 1 inside the contact insert 16 (see e.g. FIG. 4) and to be guided out of the housing 10 at the cable outlet 101.

By means of pressing contours 122 formed on the transmission portions 121, the pressing element 12 acts on a deflection element 13 in the form of a pivot lever mounted on the housing 10 about a pivot shaft 130. The pressing contours 122, which are oriented diagonally with respect to the actuation direction C, abut a bearing pin 133 on a lever arm 131 of the deflection element 13, which bearing pin extends in parallel with the pivot shaft 130, such that the deflection element 13 is pivoted about the pivot shaft 130 in the actuation direction C when the pressing element 12 is actuated.

The deflection element 13 acts on the arm 115 of the locking element 11 that extends from the actuation portion 112 by means of a further lever arm 132. When the pressing element 12 is actuated in the actuation direction C, the locking element 11 is therefore, by means of the lever arm 132 of the deflection element 13, pressed on the arm 115 in the actuation direction B, such that the locking portion 110 on the end of the locking element 11 that faces away from the actuation portion 112 is raised out of the locking engagement 21 of the mating plug-in connector part 2 and the locking is therefore released.

As a result of the diagonal orientation of the pressing contours 122 and by means of the length of the lever arms 131, 132, the step-up gear (or step-down gear) can be adjusted in order to transmit the actuation movement of the pressing element 12 to the locking element 11. The actuation movement is in this case transmitted in such a way that, when the pressing element 12 is actuated, the locking element 11 is pivoted about the pivot shaft 113 thereof sufficiently far to release the locking portion 110 out of the locking engagement 21. An adjustment force on the pressing element 12 can in this case be adjusted by suitable stepping up (or stepping down), which force allows the pressing element 12 to be actuated by a user in a user-friendly and haptically pleasant manner.

Simple intuitive operation results from the fact that the pressing element 12 is arranged on a side of the housing 10 that faces away from the locking element 11 and that the pressing element can be actuated by a user in the manner of a pistol trigger. In this case, the user can act on the locking element 11 either by means of the actuation portion 112 for example by using their thumb or by means of the pressing element 12 for example by using their forefinger, in order to release the locking.

When the user actuates the locking element 11 by pressing on the actuation portion 112 in the actuation direction B, the locking element 11 is actuated independently of the pressing element 12, i.e. without the pressing element 12 being moved together therewith or the actuation of the actuation portion 112 being prevented by the pressing element 12 in any way. In particular, the arm 115 of the locking element 11 is in this case moved away from the lever arm 132 of the deflection element 13 such that force is not transmitted to the deflection element 13 and the pressing element 12.

In contrast, when a user actuates the pressing element 12 in order to unlock the locking element 11, the deflection element 13 is therefore pivoted about the pivot shaft 130 thereof by means of the pressing element 12 and as a result an actuation force is exerted on the locking element 11 by means of the arm 115, such that the locking element 11 together with the locking portion 110 thereof is raised out of the locking engagement 21.

The locking element 11 is spring-preloaded in the locking position thereof by means of the spring element 14 such that, when the plug-in connector part 1 is plugged into the mating plug-in connector part 2 in the plug-in direction E, the locking between the locking element 11 and the locking engagement 21 on the mating plug-in connector part 2 is established automatically. The unlocking occurs counter to the spring force of the spring element 14 such that, after unlocking, the locking element 11 is automatically again reset into the locking position thereof.

In this case, the pressing element 12 is also reset by means of the spring element 14 and held in the non-actuated starting position thereof.

The basic concept of the invention is not limited to the embodiments described above, but can in principle also be implemented in completely different embodiments.

In the embodiment shown, the plug-in connector part is designed as a charging plug of a charging system for charging an electrically operated vehicle. However, a plug-in connector part of the type described herein can in principle also be designed differently, for example as a charging socket or as a completely different plug-in connector part that is intended to be connected to an associated mating plug-in connector part in order to establish an electrical connection.

The pressing element can also be designed differently to that described. In particular, the pressing element can also be slidably mounted on the housing, for example.

Likewise, the deflection element can also be arranged differently on the housing, for example so as to be able to slide on the housing.

The locking element can also be pivotable or slidable. In this respect, the embodiment shown comprising a pivotable locking element should only be understood as an example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 plug-in connector part
10 housing
100 plug-in portion
101 cable outlet
102 handle
11 locking element
110 locking portion
111 end
112 actuation portion
113 pivot shaft
114 blocking device (ring)
115 arm
12 pressing element (press button)
120 pivot shaft
121 transmission portion
122 pressing contour
13 deflection element
130 pivot shaft
131 lever arm
132 lever arm
133 bearing pin
14 spring element
15 contact elements
16 contact insert
2 mating plug-in connector part
20 plug-in opening
21 locking engagement
3 lock
4 line
B, C actuation direction
E plug-in direction

The invention claimed is:

1. A plug-in connector part for connection to an associated mating plug-in connector part, comprising:
a housing;
a plug-in portion that is arranged on the housing and is pluggable into an associated mating plug-in connector part in a plug-in direction and is engaged with the mating plug-in connector part when in a connected position, at least one electrical contact element being arranged on the plug-in portion and configured to electrically contact the mating plug-in connector part;
a locking element that is movably arranged on the housing, the locking element having a locking position for locking the plug-in connector part with respect to the mating plug-in connector part in the connected position, and being movable out of the locking position to unlock the connection between the plug-in connector part and the mating plug-in connector part; and
a pressing element movably arranged on the housing, the pressing element being actuable in a first actuation direction, and operatively connected to the locking element by a deflection element in order to act, by the deflection element, on the locking element in a second actuation direction that is different than the first actuation direction in order to unlock the connection between the plug-in connector part and the mating plug-in connector part,
wherein a first end of the locking element has a locking portion configured to lock with the mating plug-in connector part when in the connected position, and
wherein a second end of the locking element that is remote from the locking portion has an actuation portion which is actuable in the second actuation direction in order to move the locking element out of the locking position thereof.

2. The plug-in connector part according to claim 1, wherein the pressing element is arranged on a side of the housing that faces away from the locking element.

3. The plug-in connector part according to claim 1, wherein the pressing element is operatively connected to the locking element by a lever gearing, of which the deflection element is a component.

4. The plug-in connector part according to claim 1, wherein the deflection element is mounted on the housing so as to be pivotable about a first pivot shaft, and has a first lever arm that is operatively connected to the pressing element and has a second lever arm that is operatively connected to the locking element.

5. The plug-in connector part according to claim 4, wherein the pressing element is mounted on the housing so as to be pivotable about a second pivot shaft.

6. The plug-in connector part according to claim 1, wherein the pressing element has two mutually spaced transmission portions configured to act on the deflection element, an electrical line that is connected to the at least one electrical contact element being guided through between the transmission portions.

7. The plug-in connector part according to claim 1, wherein the deflection element has a bearing pin which extends transversely with respect to the second actuation direction and by which the pressing element is configured to act on the deflection element.

8. The plug-in connector part according to claim 1, wherein the pressing element is configured to act on the deflection element by a pressing contour that extends diagonally with respect to the first actuation direction.

9. The plug-in connector part according to claim 5, wherein the locking element is arranged on the housing so as to be pivotable about a third pivot shaft.

10. The plug-in connector part according to claim 1, wherein the deflection element is configured to act on an arm extending from the actuation portion in order to press the actuation portion in the second actuation direction when the pressing element is actuated.

11. The plug-in connector part according to claim 10, further comprising a blocking device arranged on the arm configured to block the locking element in the locking position.

12. The plug-in connector part according to claim 1, wherein the locking element is actuable independently of the pressing element by the actuation portion.

13. The plug-in connector part according to claim 1, wherein the actuation portion of the locking element is arranged on a first side of the housing and the pressing element is arranged on a second side of the housing that faces away from the first side.

14. A plug-in connector part for connection to an associated mating plug-in connector part, comprising:
a housing;
a plug-in portion that is arranged on the housing and is pluggable into an associated mating plug-in connector part in a plug-in direction and is engaged with the mating plug-in connector part when in a connected position, at least one electrical contact element being arranged on the plug-in portion and configured to electrically contact the mating plug-in connector part;

a locking element that is movably arranged on the housing, the locking element having a locking position for locking the plug-in connector part with respect to the mating plug-in connector part in the connected position, and being movable out of the locking position to unlock the connection between the plug-in connector part and the mating plug-in connector part; and a pressing element movably arranged on the housing, the pressing element being actuable in a first actuation direction, and operatively connected to the locking element by a deflection element in order to act, by the deflection element, on the locking element in a second actuation direction that is different than the first actuation direction in order to unlock the connection between the plug-in connector part and the mating plug-in connector part, wherein the pressing element has two mutually spaced transmission portions configured to act on the deflection element, an electrical line that is connected to the at least one electrical contact element being guided through between the transmission portions.

15. A plug-in connector part for connection to an associated mating plug-in connector part, comprising:

a housing;

a plug-in portion that is arranged on the housing and is pluggable into an associated mating plug-in connector part in a plug-in direction and is engaged with the mating plug-in connector part when in a connected position, at least one electrical contact element being arranged on the plug-in portion and configured to electrically contact the mating plug-in connector part;

a locking element that is movably arranged on the housing, the locking element having a locking position for locking the plug-in connector part with respect to the mating plug-in connector part in the connected position, and being movable out of the locking position to unlock the connection between the plug-in connector part and the mating plug-in connector part; and a pressing element movably arranged on the housing, the pressing element being actuable in a first actuation direction, and operatively connected to the locking element by a deflection element in order to act, by the deflection element, on the locking element in a second actuation direction that is different than the first actuation direction in order to unlock the connection between the plug-in connector part and the mating plug-in connector part, wherein the pressing element is configured to act on the deflection element by a pressing contour that extends diagonally with respect to the first actuation direction.

* * * * *